(12) United States Patent
Margalit et al.

(10) Patent No.: US 7,224,870 B2
(45) Date of Patent: May 29, 2007

(54) METHOD OF COUPLING FIBER TO WAVEGUIDE

(75) Inventors: Moti Margalit, Zichron Yaakov (IL); Gideon Rogovsky, Tel Aviv (IL); Eitan Avni, Karmiel (IL)

(73) Assignee: Lambda Crossing, Caesarea (IL)

( * ) Notice: Subject to any disclaimer, the term of this patent is extended or adjusted under 35 U.S.C. 154(b) by 128 days.

(21) Appl. No.: 11/063,595

(22) Filed: Feb. 24, 2005

(65) Prior Publication Data

US 2005/0201689 A1 Sep. 15, 2005

Related U.S. Application Data

(60) Provisional application No. 60/551,790, filed on Mar. 11, 2004, provisional application No. 60/551,794, filed on Mar. 11, 2004, provisional application No. 60/628,139, filed on Nov. 17, 2004.

(51) Int. Cl.
*G02B 6/30* (2006.01)

(52) U.S. Cl. ............................................. 385/49; 385/15

(58) Field of Classification Search ................ 385/49, 385/15, 31, 39, 50, 52; 350/96.17, 96.15, 350/96.2
See application file for complete search history.

(56) References Cited

U.S. PATENT DOCUMENTS

| 4,897,711 | A | | 1/1990 | Blonder et al. |
| 4,966,433 | A | * | 10/1990 | Blonder .................... 385/49 |
| 5,222,175 | A | * | 6/1993 | Tatoh ........................ 385/93 |
| 5,279,711 | A | | 1/1994 | Frankeny et al. |
| 5,534,442 | A | | 7/1996 | Parker et al. |
| 5,883,988 | A | | 3/1999 | Yamamoto et al. |
| 6,121,552 | A | | 9/2000 | Brosnihan et al. |
| 6,151,173 | A | | 11/2000 | Massit et al. |
| 6,438,297 | B1 | | 8/2002 | McKenzie |
| 6,443,631 | B1 | | 9/2002 | Case et al. |
| 6,530,698 | B1 | | 3/2003 | Kuhara et al. |
| 6,546,173 | B2 | | 4/2003 | Case et al. |
| 6,634,802 | B2 | | 10/2003 | Brezina et al. |
| 2002/0076149 | A1 | * | 6/2002 | Deacon ..................... 385/27 |

OTHER PUBLICATIONS

Hauffe et al; Methods for Passive Fiber Chip Coupling of Integrated Optical Devices; IEEE Transaction on Advanced Packaging, vol. 24, No. 4, Nov. 2001 pp. 450-455.
Moosburger et al; Pasive Alignment of Single-Mode Fibers to Integrated Polymer Waveguide Structures Utilizing a Single-Mask Process; IEEE Photonics Technology Letters; vol. 11, No. 7, Jul. 1999 pp. 848-850.
Takahashi et al; A Polymer PLC Platform with a Fiber-Alignment V-Groove to a Low-Cost 10-GbE WWDM Transmitter; IEEE Photonics Letters; vol. 16, No. 1, Jan. 2004 pp. 266-268.

* cited by examiner

*Primary Examiner*—Akm Ullah
*Assistant Examiner*—Hung Lam
(74) *Attorney, Agent, or Firm*—Simon Kahn

(57) ABSTRACT

A method of producing a PLC based optical component comprising: defining a waveguide; etching a notch thereby defining a facet of the waveguide; and cutting a trench in front of the notch, the cutting being accomplished subsequent to the etching, whereby at least a portion of the trench is displaced from the facet by the notch. The invention also provides for a PLC based optical component comprising: a substrate; a waveguide deposited above the substrate, the waveguide exhibiting a facet; a notch etched in front of the facet of the waveguide; and a trench cut in front of the notch.

6 Claims, 4 Drawing Sheets

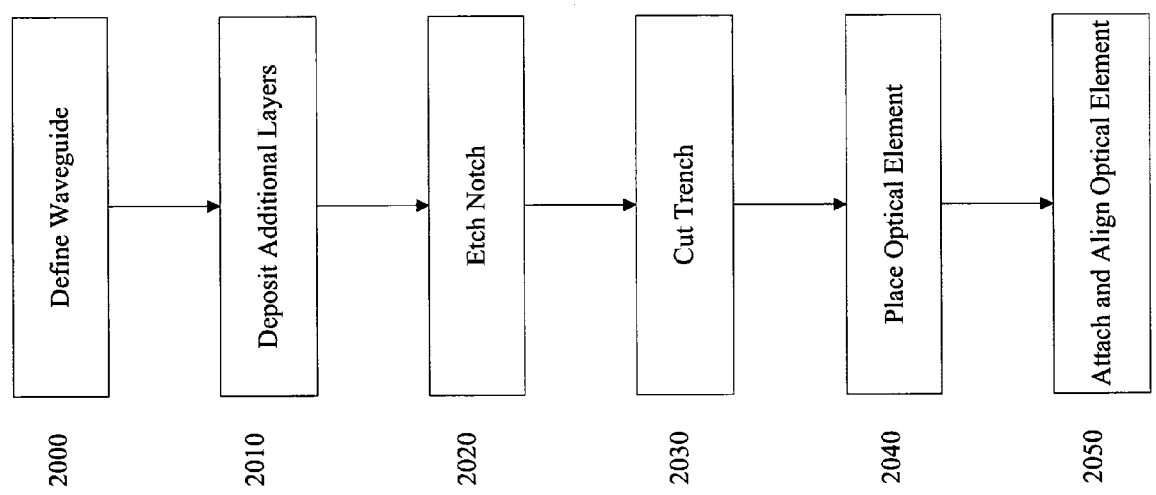

METHOD OF COUPLING FIBER TO WAVEGUIDE

This application claims priority from U.S. Provisional Patent Application Ser. No. 60/551,790 filed Mar. 11, 2004 entitled "Method of Coupling Fiber to Waveguide"; U.S. Provisional Patent Application Ser. No. 60/551,794 filed Mar. 11, 2004 entitled "Method of Connecting an Optical Element to a PLC"; and U.S. Provisional Patent Application Ser. No. 60/628,139 filed Nov. 17, 2004 entitled "Method of Connecting an Optical Element to a PLC", the contents of each of which are incorporated herein by reference.

BACKGROUND OF THE INVENTION

The invention relates generally to the field of planar lightwave circuits and in particular to a method of defining a waveguide end in a planar lightwave circuit.

Optical fiber is commonly used in telecommunication equipment to carry an optical signal. Optical sub-components, devices and modules, hereinafter generally referred to as optical components typically comprise at least one element which operates on the optical signal. Such an operation may comprise conversion between an electrical signal and an optical signal. Advantageously, optical components are produced in the form of a planar lightwave circuit (PLC), thus allowing for consistent mass production and effective cost reduction.

A major difficulty in the production of optical components is in the stage of aligning an optical fiber with a waveguide of the PLC. Improper alignment leads to significant losses and depreciated performance of the PLC. One well developed technique for aligning an optical fiber with a waveguide involves the use of a v-groove etched into the substrate of the PLC. The fiber is secured in the v-groove, thus ensuring proper alignment in relation to the waveguide. In order to fully expose the end of the waveguide a dice line, or saw cut, is typically made thus also cleaning out the end of the v-groove facing the waveguide. Unfortunately, the facet of the waveguide exposed by a saw cut is not sufficiently clean, and thus polishing of the facet is typically required.

FIG. 1 shows a side view of a PLC based component 10 comprising a substrate 60 and a fiber 30 having core 50. Substrate 60 exhibits v-groove 20, waveguide 40 and trench 70 according to the prior art. V-groove 20 is etched into a portion of substrate 60 so as to accommodate fiber 30. V-groove 20 is dimensioned so as to align core 50 of fiber 30 with waveguide 40. Trench 70 is cut defining a facet of waveguide 40 and cleaning out the end of v-groove 20. Fiber 30 is butt coupled to the facet of waveguide 40.

In order to enable optimum operation of the optical component, the facet of waveguide 40 must be polished prior to bringing the waveguide to a butt coupling with optical fiber 30. This polishing is an additional costly stage in the production of a PLC.

One prior art technique to avoid the extra polishing involves a combination dicing and polishing technique. In this technique, both polishing and dicing are accomplished simultaneously. Unfortunately this technique is somewhat difficult to accomplish in many situations.

Thus, there is a need for an improved method for coupling an optical fiber with a waveguide, and in particular a method that allows for clearing out the end of the v-groove exposing the waveguide end while ensuring a polished facet for the waveguide. Preferably, such a technique will allow for improved coupling of the waveguide with other optical elements used in a PLC.

SUMMARY OF THE INVENTION

Accordingly, it is a principal object of the present invention to overcome the disadvantages of prior art methods of coupling to a PLC based waveguide. This is provided in the present invention by first etching a notch defining a facet of the waveguide. Subsequently, a trench is cut in front of the notch. Butt coupling of the fiber is then accomplished with the fiber core being less than a mode diameter from the waveguide facet.

The invention provides for a method of producing a PLC based optical component comprising: defining a waveguide; etching a notch thereby defining a facet of the waveguide; and cutting a trench in front of the notch, the cutting being accomplished subsequent to the etching, whereby at least a portion of the trench is displaced from the facet by the notch.

In one embodiment the method further comprises depositing a mask layer, the depositing being accomplished before the defining a waveguide. In a further embodiment the method further comprises etching a v-groove. In one yet further embodiment the stage of v-groove is accomplished utilizing the deposited mask layer. In another yet further embodiment the method further comprises the stage of aligning an optical fiber placed in the etched v-groove with the defined facet of the waveguide.

In another embodiment the method further comprises the stage of aligning an optical fiber with the defined facet of the waveguide. In yet another embodiment the method further comprises coating the defined facet, the coating preceding the cutting. In an exemplary embodiment the coating is accomplished at least partially with $Si_3N_4$.

In another embodiment the method further comprises placing an element in the trench. In one further embodiment the element is a photodiode. In another embodiment the method further comprises aligning the placed element with the defined facet of the waveguide. Preferably, the element is a photodiode.

In one embodiment the cutting comprises one of sawing and dicing. In another embodiment the notch exhibits a width less than the optical mode width of light constrained within the waveguide.

The invention also provides for a PLC based optical component produced in accordance with any of the above methods.

The invention also provides for a PLC based optical component comprising: a substrate; a waveguide deposited above the substrate, a notch etched to the depth of the waveguide, the notch defining a facet of the waveguide; and a trench cut in front of the notch, the trench being displaced from the defined waveguide facet by the notch.

In one embodiment the PLC based optical component further comprises an optical component placed within the trench, the optical component being aligned with the waveguide facet. In another embodiment the trench exhibits a wall opposing the waveguide facet, the wall presenting an oblique angle to an axis of the waveguide. In a further embodiment the PLC based optical component further comprises an optical component placed within the trench against the wall, the optical component being aligned with the waveguide facet.

In one embodiment the notch exhibits a width less than the optical mode width of light constrained within the waveguide. In another embodiment the PLC based optical component further comprises an optical fiber exhibiting a core, the optical fiber core being optically aligned with the waveguide. In one further embodiment the PLC based optical component further comprises a v-groove, the optical fiber being placed in the v-groove. In another further embodiment the notch exhibits a width less than the optical mode width of light constrained within the optical fiber Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 6 is a high level flow chart of the stages in production of a PLC based optical component having an element aligned with a waveguide in accordance with the principle of the invention.

DETAILED DESCRIPTION OF THE PREFERRED EMBODIMENTS

Figure 2B:
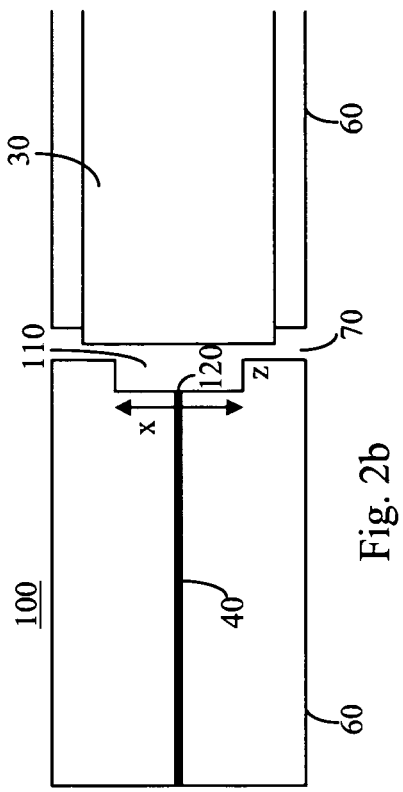
FIG. 2b illustrates a top view of a PLC based optical component according to the principle of the invention.
Figure 1:
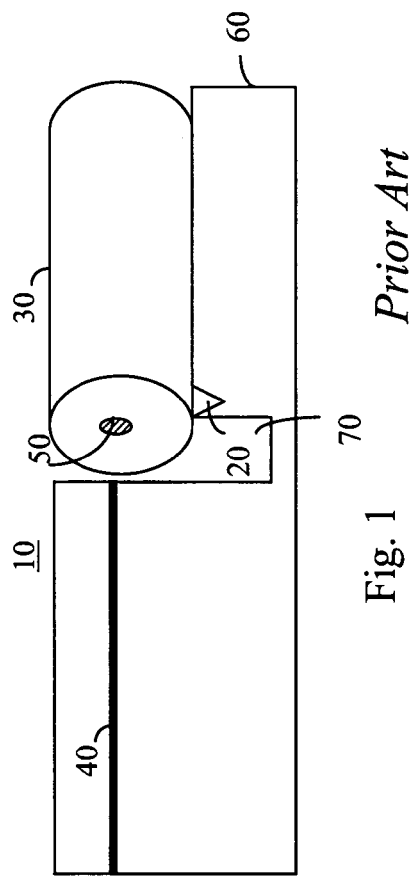
FIG. 1 illustrates a side view of a PLC based optical component according to the prior art.

The present embodiments enable an improved method of coupling an element such as an optical fiber or photodiode to a planar waveguide, providing for a polished facet defining the waveguide end at a reduced cost. Optionally the waveguide facet is angled. This is accomplished by etching a notch defining the waveguide facet, and subsequently saw cutting or dicing a trench in front of the notch. The trench cut thus does not come into contact with the waveguide facet.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
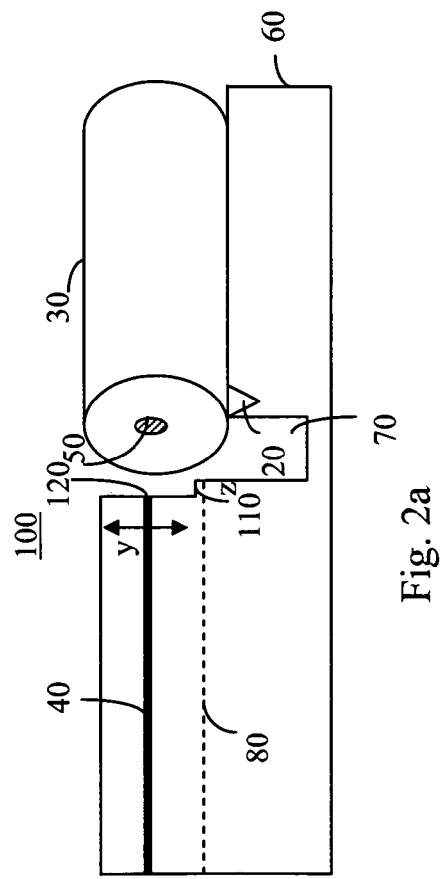
FIG. 2a illustrates a side view of a PLC based optical component according to the principle of the invention.

FIG. 2a illustrates a side view of a PLC based component 100 according to the principle of the invention comprising substrate 60 and fiber 30 exhibiting core 50. The top of substrate 60 is generally shown as line 80. A waveguide 40 is defined in layers deposited above substrate 60, and a V-groove 20 is defined in substrate 60 as known in the prior art to secure fiber 30 in optical alignment with waveguide 40. V-groove 20 is dimensioned so as to ensure optical alignment of core 50 of fiber 30 with waveguide 40. A notch 110 having a depth y and a width z is etched to define a facet 120 of waveguide 40. Trench 70 is subsequently cut cleaning out the end of v-groove 20. A unique feature of the invention is that facet 120 is defined by chemical etching in advance of, and independently of, the cutting of trench 70. Facet 120, defined by chemical etching may be perpendicular to waveguide 40, or may be angled to reduce back reflection without exceeding the scope of the invention.

Fiber 30 is butt coupled as close as possible to facet 120 of waveguide 40. In a preferred embodiment width z of notch 110 is less than the optical mode width of light constrained in core 50. In an exemplary preferred embodiment width z is on the order of 5 microns. The end of fiber 30 is thus separated from facet 40 approximately by width z of notch 110. In a preferred embodiment depth y of notch 110 is cut to a depth sufficient to reveal waveguide 40 and thus define facet 120, and even further preferably is larger than the optical mode width of light constrained in core 50. In an exemplary embodiment, notch 110 does not extend to the silicon of substrate 60.

FIG. 2b illustrates a top view of a PLC based component 100, with any layers above a waveguide 40 removed, according to the principle of the invention. PLC based component 100 comprises substrate 60 and fiber 30. Waveguide 40 is defined in layers deposited on substrate 60, and fiber 30 is secured in optical alignment with waveguide 40. Notch 110 having length x and width z is etched to define facet 120 of waveguide 40. Trench 70 is subsequently cut. A unique feature of the invention is that facet 120 is defined by chemical etching in advance of, and independently of, the cutting of trench 70. Facet 120, defined by chemical etching, may be perpendicular to waveguide 40 or may be angled to reduce back reflection without exceeding the scope of the invention.

Fiber 30 is butt coupled as close as possible to facet 120 of waveguide 40. In a preferred embodiment length x of notch 110 is greater than the optical mode width, and in an exemplary preferred embodiment is on the order of 20 microns. The end of fiber 30 is separated from facet 40 approximately by width z of notch 110.

Figure 3:
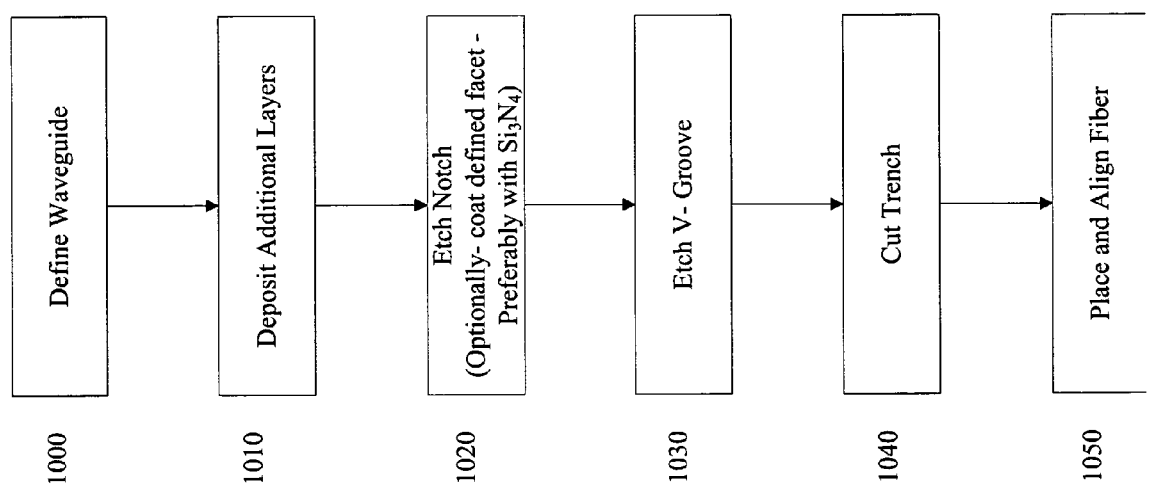
FIG. 3 is a high level flow chart of the stages in production of a PLC based optical component having an optical fiber aligned with a waveguide in accordance with the principle of the invention.

FIG. 3 is a high level flow chart of the stages in production of a PLC based component having an optical fiber aligned with a waveguide in accordance with the principle of the invention. In stage 1000 a waveguide is defined, typically in a layer above the substrate. Optionally, a mask layer is deposited and etched for use in defining a v-groove. In stage 1010 additional layers, including a layer burying the waveguide are deposited.

In stage 1020 a notch is etched defining a facet of the waveguide. The facet defined by etching the notch may be perpendicular to the layers deposited or angled without exceeding the scope of the invention. Advantageously, an etched facet requires no further polishing. Optionally, the facet is coated to protect it during subsequent etching of the v-groove in the silicon substrate. In an exemplary embodiment, the facet is coated with $Si_3N_4$.

In stage 1030 a v-groove is etched is etched in the silicon substrate to ensure proper placement of an optical fiber in relation to the waveguide defined in stage 1000 above. In a preferred embodiment, the notch is etched utilizing the optional mask layer deposited and etched in stage 1000 above. In one embodiment, the optional mask layer and the facet coating is removed after the v-groove is etched.

In stage 1040 a trench is sawed, cut or diced, denoted generally as cut, in front of the notch etched in stage 1020. Cutting the trench cleans out any remnants of the v-groove etched in stage 1030 allowing the optical fiber clear access up to the end of the notch etched in stage 1020.

In stage 1050, an optical fiber is placed, optically aligned and secured in the v-groove defined in stage 1030 above, thus creating a PLC based optical component having a waveguide with a polished facet in optical alignment with an optical fiber in accordance with the principle of the invention.

Figure 4A:
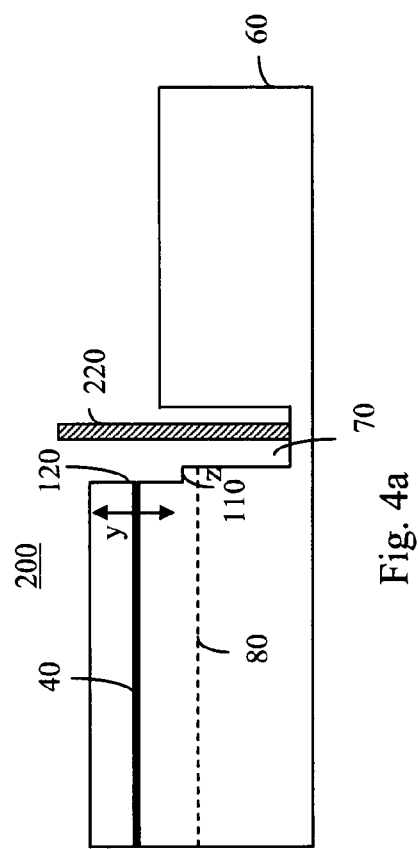
FIG. 4a illustrates a side view of a PLC based optical component having an element placed within a trench according to the principle of the current invention.

FIG. 4*a* illustrates a side view of a PLC based component 200 according to the principle of the invention comprising a substrate 60 and an optical component 220. The top of substrate 60 is generally shown as line 80. Waveguide 40 is defined in layers deposited on substrate 60, and notch 110 having a depth y and a width z is etched to define facet 120 of waveguide 40. Trench 70 is subsequently cut defining a location for optical component 220. Trench 70 may be cut perpendicular to substrate 60, or angled without exceeding the scope of the invention.

A unique feature of the invention is that facet 120 is defined by chemical etching in advance of, and independently of, the cutting of trench 70. Facet 120, defined by chemical etching, may be perpendicular to waveguide 40 or may be angled to reduce back reflection, without exceeding the scope of the invention.

Optical component 220, which in an exemplary embodiment is a photodiode, is placed in trench 70. Optical component 220 is attached using flying connections, or in any other manner known to those skilled in the art and is aligned with waveguide 40. Width z of notch 110 may be greater than or less than the optical mode width of light constrained in waveguide 40, in accordance with the requirements of optical component 220 and waveguide 40. In a preferred embodiment depth y of notch 110 is cut to a depth sufficient to reveal waveguide 40 and thus define facet 120, and even further preferably is larger than the optical mode. In an exemplary embodiment, notch 110 does not extend to the silicon of substrate 60.

Figure 4B:
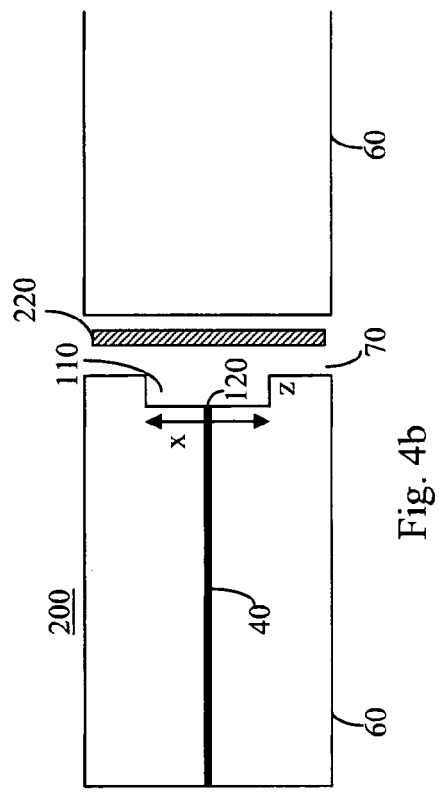
FIG. 4b illustrates a top view of a PLC based optical component having an element placed within a trench according to the principle of the current invention.

FIG. 4*b* illustrates a top view of a PLC based component 200, with any layers above a waveguide 40 removed, according to the principle of the invention. PLC based component 200 comprises a substrate 60 and an optical component 220, which in an exemplary embodiment comprises a photodiode. Waveguide 40 is defined on substrate 60, and a notch 110 having a length x and a width z is etched to define a facet 120 of waveguide 40. Trench 70 is subsequently cut to accommodate optical component 220. A unique feature of the invention is that facet 120 is defined by chemical etching in advance of, and independently of, the cutting of trench 70. Facet 120, defined by chemical etching may be perpendicular to waveguide 40, or may be angled to reduce back reflection without exceeding the scope of the invention.

Optical component 220 is placed into trench 70 and attached using flying connections, or in any other manner known to those skilled in the art and is aligned with waveguide 40. In a preferred embodiment length x of notch 110 is greater than the optical mode width, and in an exemplary preferred embodiment is on the order of 20 microns.

Figure 5:
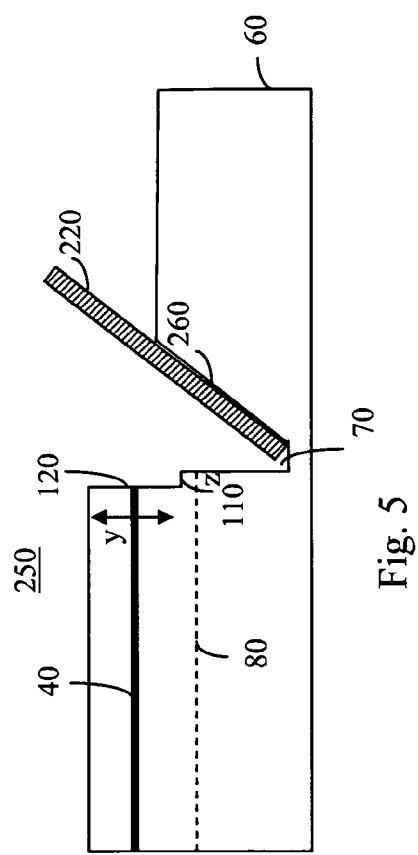
FIG. 5 illustrates a side view of a PLC based optical component having an element placed with a sloped trench according to the principle of the current invention.

FIG. 5 illustrates a side view of a PLC based component 250 exhibiting a sloped trench according to the principle of the invention comprising a substrate 60 and an optical component 220. The top of substrate 60 is generally shown as line 80. Waveguide 40 is defined in layers deposited on substrate 60, and a notch 110 having a depth y and a width z is etched to define facet 120 of waveguide 40. Trench 70 is subsequently cut defining a location for optical component 220. Trench 70 exhibits a sloped surface 260 opposing facet 120 of waveguide 40. In an exemplary embodiment, sloped surface 260 defines an oblique angle between a plane of optical component 220 and the axis of light proceeding from waveguide 40. In an exemplary embodiment the angle is between 5° and 85°, preferably between 30° and 70°.

A unique feature of the invention is that facet 120 is defined by chemical etching in advance of, and independently of, the cutting of trench 70. Facet 120, defined by chemical etching, may be perpendicular to waveguide 40 or may be angled to reduce back reflection, without exceeding the scope of the invention.

Optical component 220, which in an exemplary embodiment is a photodiode, is placed in trench 70 against wall 260. Optical component 220 is attached using flying connections, or in any other manner known to those skilled in the art and is aligned with waveguide 40. Width z of notch 110 may be greater than or less than the optical mode width of light constrained in waveguide 40, in accordance with the requirements of optical component 220 and waveguide 40. In a preferred embodiment depth y of notch 110 is cut to a depth sufficient to reveal waveguide 40 and thus define facet 120, and even further preferably is larger than the optical mode. In an exemplary embodiment, notch 110 does not extend to the silicon of substrate 60.

FIG. 6 is a high level flow chart of the stages in production of a PLC based optical component having an element aligned with a waveguide in accordance with the principle of the invention. In stage 2000, a waveguide is defined. In an exemplary embodiment the waveguide is defined in a layer above the substrate. In stage 2010 additional layers, including a layer burying the waveguide are deposited. In stage 2020 a notch is etched at the end of the waveguide. The facet defined by etching the notch may be perpendicular to the layers deposited or angled without exceeding the scope of the invention. Advantageously, an etched facet requires no further polishing.

In stage 2030 a trench is sawed, cut or diced, denoted generally as cut, in front of the notch etched in stage 2020. Cutting the trench defines a location for placement of an optical component to be aligned with the waveguide defined in stage 2000 above.

In stage 2040, an element such as a photodiode, is placed within the trench cut above in stage 2030. In stage 2050, the element is electrically connected to the PLC based component and aligned with the waveguide defined in stage 2000 above, thus creating a PLC based component having a waveguide with a polished facet in optical alignment with an element in accordance with the principle of the invention.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A PLC based optical component comprising:
   a substrate;
   a waveguide deposited above said substrate;
   a notch etched to the depth of said waveguide, said notch defining a facet of said waveguide and exhibiting a width less than the optical mode width of light constrained within said waveguide; and
   a trench cut in front of said notch, said trench being displaced from said defined waveguide facet by said notch.

2. A PLC based optical component in accordance with claim 1, further comprising an optical component placed within said trench, said optical component being aligned with said waveguide facet.

3. A PLC based optical component in accordance with claim 1, wherein said trench exhibits a wall opposing said waveguide facet, said wall presenting an oblique angle to an axis of said waveguide.

4. A PLC based optical component in accordance with claim 3, further comprising an optical component placed within said trench against said wall, said optical component being aligned with said waveguide facet.

5. A PLC based optical component in accordance with claim 1, further comprising an optical fiber exhibiting a core, said optical fiber core being optically aligned with said waveguide.

6. A PLC based optical component in accordance with claim 5, further comprising a v-groove, said optical fiber being placed in said v-groove.

* * * * *